(12) United States Patent
Kanerva et al.

(10) Patent No.: US 8,913,527 B2
(45) Date of Patent: Dec. 16, 2014

(54) MULTIPLE DIE COMMUNICATION SYSTEM

(75) Inventors: Tommi Kanerva, Tampere (FI); Pasi Kolinummi, Kangasala (FI); Mika Koikkalainen, Tampere (FI)

(73) Assignee: Nokia Corporation, Espoo (FI)

( * ) Notice: Subject to any disclaimer, the term of this patent is extended or adjusted under 35 U.S.C. 154(b) by 1382 days.

(21) Appl. No.: 12/157,918

(22) Filed: Jun. 12, 2008

(65) Prior Publication Data

US 2009/0310521 A1     Dec. 17, 2009

(51) Int. Cl.
*H04B 1/56* (2006.01)
*H04L 5/14* (2006.01)
*H04L 12/24* (2006.01)

(52) U.S. Cl.
CPC ............ *H04L 41/083* (2013.01); *H04L 41/145* (2013.01); *H04L 5/14* (2013.01)
USPC ........................................................ 370/277

(58) Field of Classification Search
CPC ........................................................ H04L 5/14
USPC ........................................................ 370/277
See application file for complete search history.

(56) References Cited

U.S. PATENT DOCUMENTS

| | | | | |
|---|---|---|---|---|
| 6,148,391 A | * | 11/2000 | Petrick | 712/202 |
| 6,325,293 B1 | * | 12/2001 | Moreno | 235/492 |
| 6,653,740 B2 | * | 11/2003 | Kinzer et al. | 257/778 |
| 6,654,846 B1 | * | 11/2003 | Franca-Neto | 710/305 |
| 6,714,985 B1 | * | 3/2004 | Malagrino et al. | 709/236 |
| 7,743,172 B2 | * | 6/2010 | Chauve et al. | 710/6 |
| 2003/0217213 A1 | * | 11/2003 | Imming et al. | 710/305 |
| 2004/0039835 A1 | * | 2/2004 | Glenn et al. | 709/231 |
| 2006/0039330 A1 | * | 2/2006 | Hackett et al. | 370/335 |
| 2009/0016525 A1 | * | 1/2009 | Bertoni et al. | 380/200 |

FOREIGN PATENT DOCUMENTS

| WO | WO 02/058330 | 7/2002 |
|---|---|---|
| WO | WO 2008/020401 | 2/2008 |

\* cited by examiner

*Primary Examiner* — Mark Rinehart
*Assistant Examiner* — Maharishi Khirodhar
(74) *Attorney, Agent, or Firm* — Locke Lord LLP

(57) ABSTRACT

Suitably arranged circuits located on a die surface of respective multiple dies are operatively connected via a physical link, which is configured for full-duplex operation. Data information content is transferred between the operatively connected suitably arranged circuits via the full-duplex physical link which is configured as a fragmented data interconnected (FDI) physical link allowing peer-to-peer operation and pipelining. The data information content is carried in data fragments by a self-contained data packet structure. In one embodiment a device comprises a first suitably arranged and configured circuit located on a die surface, a second suitably arranged and configured circuit located on a die surface and a full-duplex physical link arranged and configured for operatively connecting the first circuit located on the die surface to the second circuit located on the die surface for transferring data information content between the first circuit and the second circuit.

19 Claims, 5 Drawing Sheets

MULTIPLE DIE COMMUNICATION SYSTEM

BACKGROUND

1. Field of the Invention

The present invention relates generally to the field of electronics and more particularly to the field of multiple die interconnection and data transfer between multiple dies.

2. Description of Related Art

There are situations in which a system, device, node, access point, base station, mobile station and the like will be implemented with multiple dies in a package such as, for example, an application specific integrated circuit (ASIC), field programmable gate array (FPGA) or some other suitable package system. Such multiple die implementations are, for example, common in system development as well as for products without sufficiently high volumes. In contrast to multiple die implementations for low volume products, monolithic die integration is usually preferred for very high volume products. In multiple die implementations, there must be a way to provide communication and interconnection between the dies in the multiple die system design.

One known multiple die data communication link design uses the same data path for data that is transmitted and received between the dies. In non-posted writes and reads [a first command is initiated (a transmit signal) and then a response (a receive signal) is received back], the other potential link users i.e. other circuits for example on the dies, are not able to utilize the link when an access is pending, which leads to a less than optimal or desired throughput. In other words, during the time the link is waiting for response, it is not transmitting any real data and cannot transmit any data until such time as the destination gives the response.

The die's internal signal connection count between functional entities is almost free i.e. there can be literally thousands of signals without any problem. The signal connections between dies are quite expensive, thus the link count is limited and the pin count is heavily optimized. When the functionality is split into two dies, the data communication link between the two dies is often one of the bottlenecks of the design. Some drawbacks presented by the data communication link design include for example, additional latency, limited data throughput and the additional power that is consumed by the receiver and transmitter and the input/output (I/O) design configuration of the link.

An example of an on-chip-interconnect implementation in an application specific integrated circuit is shown in FIG. 1 and generally designated 8. In this example, the functionality is split into two dies. A first die generally designated 10 is connected to a second die generally designated 12 by means of a master-slave link generally designated 14. The first die 10 is configured as the master side and includes an on-chip interconnect design generally designated 10a, a microprocessor 10b, one or more modules 10c, a direct memory access 10d and a master data transfer controller 10e, and an off-die memory 10f, all of which are suitably arranged and interconnected to carry out the intended functionality according to the circuit or system design. The second die 12 is configured as the slave side and includes an on-chip interconnect design 12a, one or more modules 12b and a slave data transfer controller 12c. The same signals are used to transfer data in one direction and the other direction between the two dies 10, 12 over the master-slave link 14. The master-slave link 14 is a half-duplex data communication link and in accordance with half-duplex data communication link operation only one non-burst and one non-posted access can be pending at a time.

In addition, only the master side, which in the example is on die 10 of the master-slave link 14, can initiate a data transfer and this restriction further complicates the system design. The slave side, which in the example is on die 12 needs to raise attention with signals other than the signal provided by the master-slave data link 14. A suitable protocol for the master-slave link implementation must be used for example, for processor accesses through a die boundary further adding to the complexity of the system design. In the solutions such as shown in the example illustrated in FIG. 1, a processing occurring on die 10 may require information from die 12 to carry out an action or operation. In this example, a request is sent from die 10 to die 12 via the half-duplex master-slave link 14. The processing on die 10 must now wait until it receives the requested information from die 12 before proceeding. Because the master-slave half-duplex link 14 can only move information in one direction at a time, die 12 cannot receive additional information requests from die 10 until it responds to the "open" request. Once the die 10 receives the requested information, processing of that particular action or operation can continue to complete the access. In other words, the accesses and responses must complete in the order in which they occur.

Although "off-chip" interconnect solutions such as master-slave half-duplex link connections have been used for example, for connecting code division multiple access (CDMA) or wideband code division multiple access (WCDMA) accelerators to a suitable cooperating application specific integrated circuit (ASIC), these solutions are not satisfactory for data communication between multiple dies, and particularly for systems that are tightly coupled and divided into multiple dies and even more particularly for modern communication systems such as for example, the 3rd Generation Partnership Project (3GPP) Evolved Universal Terrestrial Radio Access Network (EUTRAN).

What is needed therefore is a way to provide data communication between multiple dies that overcomes the design drawbacks of known solutions.

SUMMARY

In accordance with a first broad aspect of the invention, suitably arranged circuits located on a die surface are operatively connected via a physical link which is configured for full-duplex operation. Data information content is transferred between the operatively connected suitably arranged circuits via the full-duplex physical link. In some embodiments, the first and second suitably arranged circuits are located on the surface of the same die. In some embodiments, the first suitably arranged circuit is located on the surface of a first die and the second suitably arranged circuit is located on the surface of a second die. In some embodiments the full-duplex physical link is configured as a fragmented data interconnect (FDI) full-duplex physical link. In some embodiments one of the first or second suitably arranged circuits located on the first die or the second die respectively accesses resources located on the other of the first or second suitably arranged circuits located on the other of the first die or second die. In some embodiments the first and second suitably arranged circuits are configured for peer-to-peer operation. In some embodiments the data information content is configured for transfer between the operatively connected suitably arranged circuits in a self-contained data packet structure. In some embodiments the self-contained data packet structure is configured for identifying suitable information for on-chip implementation initiatives and on-chip interconnect implementation responses. In some embodiments off-die accesses between a respective one or more first suitably arranged circuits located on a first die and a respective one or more second suitably arranged circuits located on a second die are provided via the full-duplex physical link. In some embodiments data information content is transferred in one direction only from a first die to a second die and in the opposite dirctiondirection only from the second die to the first die.

In accordance with a second broad aspect of the invention, a device comprises a first suitably arranged and configured circuit located on a die surface, a second suitably arranged and configured circuit located on a die surface and a full-duplex physical link arranged and configured for operatively connecting the first suitably arranged and configured circuit located on the die surface to the second suitably arranged and configured circuit located on the die surface for transferring data information content between the first suitably arranged and configured circuit and the second suitably arranged and configured circuit. In some embodiments the first suitably arranged and configured circuit is located on a first die surface and the second suitably arranged and configured circuit is located on a second die surface wherein in other embodiments the first die surface and the second die surface comprise a surface of a single die. In some embodiments the first suitably arranged and configured circuit and the second suitably arranged and configured circuit are configured for peer-to-peer connection and operation. In some embodiments at least one of the first suitably arranged and configured circuit or the second suitably arranged and configured circuit comprises a microprocessor. In some embodiments the first suitably arranged and configured circuit comprises an on-chip interconnect implementation, and the second suitably arranged and configured circuit comprises an on-chip interconnect implementation. In some embodiments the first suitably arranged and configured circuit comprises a first data transmitter and a first data receiver, and the second suitably arranged and configured circuit comprises a second data transmitter and a second data receiver wherein in some other embodiments the first data transmitter and the second data transmitter are arranged and configured for forming self-contained data packets. In some embodiments the self-contained data packets are further arranged and configured as fragmented data packets and the first data receiver and the second data receiver are arranged and configured for receiving the fragmented data packets. In some embodiments the full-duplex physical link is arranged and configured as a fragmented data interconnect physical link wherein the data information content comprises fragmented data packets arranged and configured for transfer in a one direction link from a first of the first or second suitably arranged and configured circuits for receiving in the other of the first or second suitably arranged and configured circuits, and wherein the data information content comprises fragmented data packets arranged and configured for transfer in a second one direction link in a direction opposite from the first one direction link from the second of the first or second suitably arranged and configured circuits for receiving in the other of the first or second suitably arranged and configured circuits.

In a third broad aspect of the present invention a device comprises a first die comprising microprocessor controlled cellular modem logic, a second die comprising an evolved universal terrestrial radio access network hardware accelerator, and a full-duplex physical link arranged and configured as a die input/output interface for connecting the first die to the second die such that the microprocessor is enabled with off-die access to and from the second die.

In a fourth broad aspect of the invention apparatus comprises means for connecting suitably arranged and configured circuits located on a die surface via a physical link, means for configuring the physical link for full-duplex operation; and means responsive to the full-duplex physical link for transferring data between the suitably arranged and configured circuits.

In a fifth broad aspect of the invention a device comprises one or more modules arranged and configured for operatively connecting suitably arranged circuits located on a die surface via a physical link, one or more modules arranged and configured for configuring the physical link for full-duplex operation, and one or more modules arranged and configured for transferring data information content between the suitably arranged circuits via the full-duplex physical link. In some embodiments the device is a mobile communication device.

BRIEF DESCRIPTION OF THE DRAWINGS

Other features and benefits of the invention will become readily apparent from the following written description of exemplary embodiments taken in conjunction with the drawing figures wherein.

DETAILED DESCRIPTION

According to some embodiments the present invention provides a way for solving the problem of connecting multiple dies together. The multiple dies may be separate and located for example on a printed wiring board (PWB), or they may be stacked together, or they may be arranged or configured for carrying out their respective intended functionality in any suitable manner as now known or developed in the future. The scope of the invention is not intended to be limited to connecting such multiple dies together as will become readily apparent from the description herein.

Figure 1:
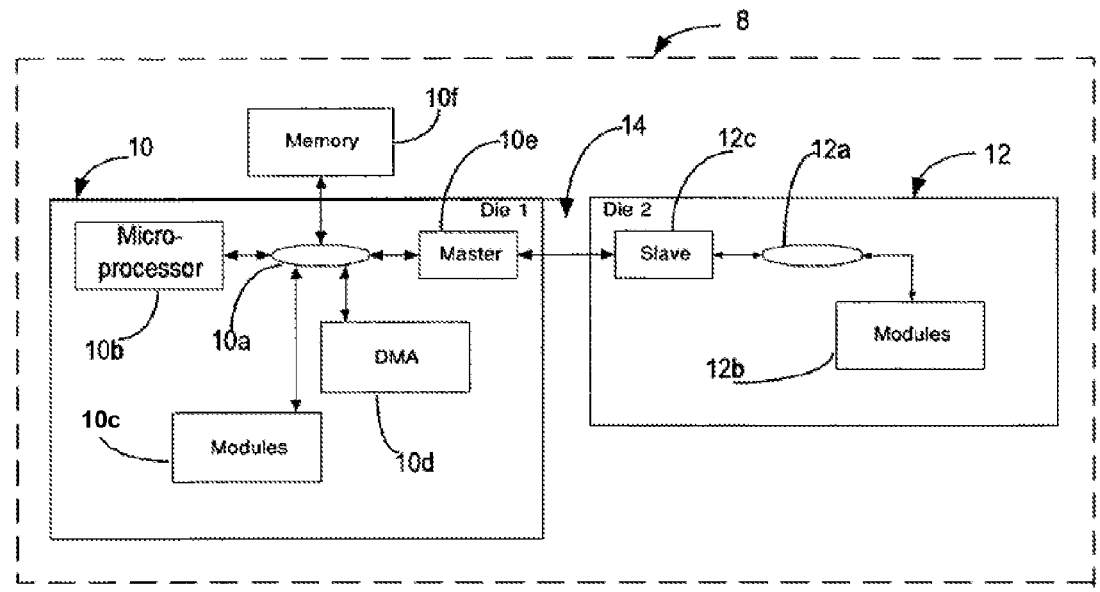
FIG. 1 is a functional circuit block diagram showing an example of an application specific integrated circuit input/output (ASIC I/O) master-slave interface on-chip interconnect implementation.
Figure 2:
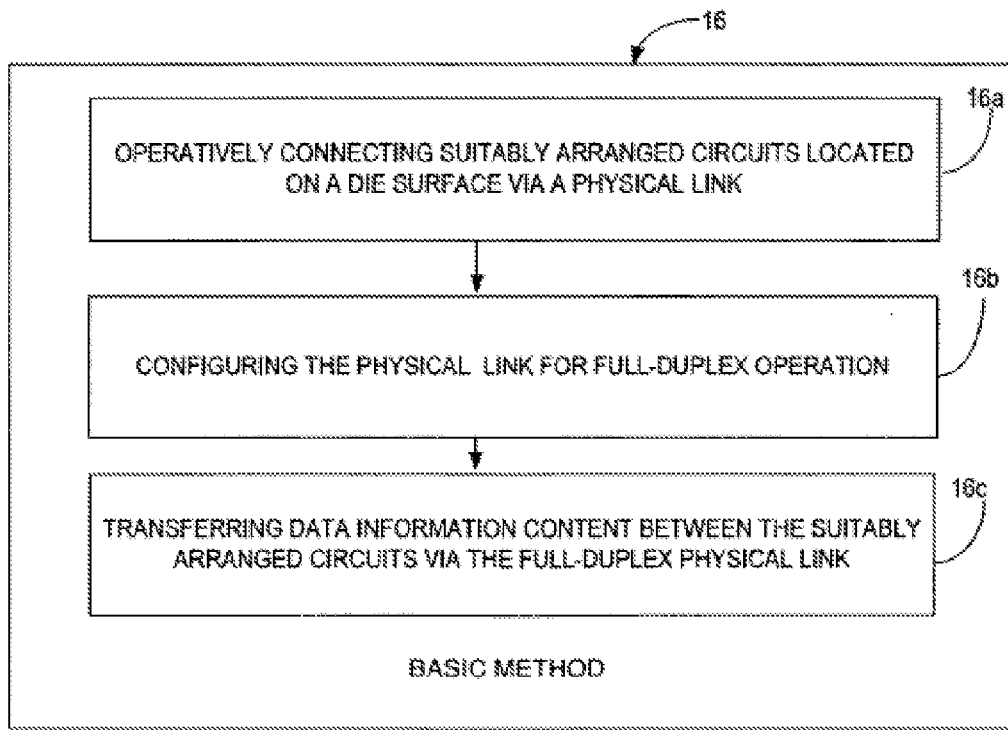
FIG. 2 shows a flowchart of the basic steps of the method for data information content transfer between circuits located on a die surface according to some embodiments of the present invention.

FIG. 2 shows a flowchart generally designated as 16 having basic steps or actions 16a, 16b, 16c for implementing the inventive method according to some embodiments of the present invention, for example in a suitable electronic device or apparatus, comprising operatively connecting suitably arranged circuits located on a die surface via a physical link (step 16a), configuring the physical link for full-duplex operation (step 16b) and transferring data information content between the suitably arranged circuits via the full-duplex physical link (step 16c). These steps 16a, 16b and 16c may be implemented in one or more modules configured to do the same in such electronic device such as for example a mobile communication terminal or such like device. The scope of the invention is not intended to be limited to the order in which the steps or actions in FIG. 2 are performed. Further, the scope of the invention is not intended to be limited to any particular implementation using technology now known or developed in the future for locating the operatively connected circuits on the same die surface or on multiple die surfaces.

It is understood that the aforementioned methods may include other steps known in the art that do not form a part of the underlying invention.

Figure 3:
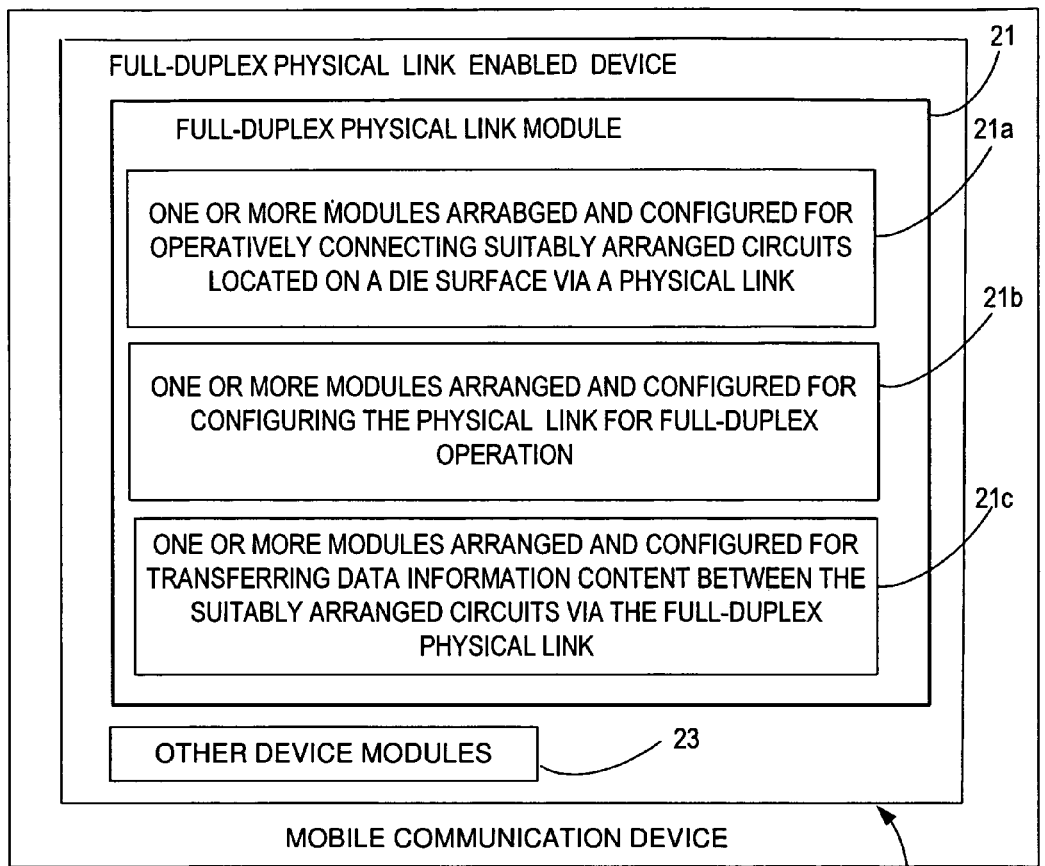
FIG. 3 shows a full-duplex physical link enabled device in the form of a mobile communication device according to some embodiments of the invention.

FIG. 3 shows by way of example, a mobile communication device generally designated 17 in the form of a full-duplex physical link enabled device generally designated 19 according to some embodiments of the present invention. The full-duplex physical link enabled device 19 has one or more full-duplex physical link modules 21 including a module 21a configured for operatively connecting suitably arranged circuits located on a die surface via a physical link, a module 21b for configuring the physical link for full-duplex operation and a module 21c configured for transferring data information content between the suitably arranged circuits via the full-duple physical link.

Consistent with that described above, the full-duplex physical link enabled device 19 is shown in the form of a mobile communication device 17 or other suitable electronic device now known or developed in the future. The full-duplex physical link enabled device 19 may also have other device modules 23 that do not form part of the underlying invention and are not described in detail herein.

Figure 4:
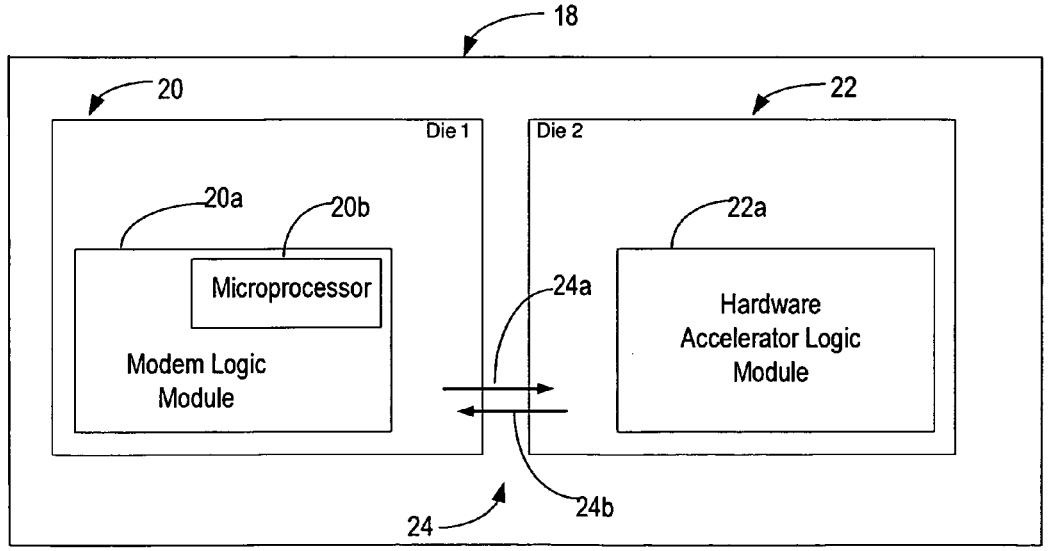
FIG. 4 shows an example of a basic implementation for data information content transfer between suitably configured circuits located on the respective surfaces of two different dies in accordance with some embodiments of the invention.

In accordance with some embodiments of the invention for example as shown in an implementation generally designated 18 in FIG. 4 the main design entities contemplate a wideband code division multiple access (WCDMA) and global system for mobile communication (GSM) cellular modem logic module including microprocessor resources and a suitable logic module configured as a plain hardware accelerator. The two modules are split between two different dies and require a link over die boundary to connect them. The processor core and the logic that it is controlling are fabricated into two separate dies. The split is done for purposes of scheduling, flexibility and available silicon die area. A first die 20 is configured with a modem logic module generally designated 20a, which is arranged with a microprocessor 20b. A second die 22 is configured with a hardware accelerator logic module designated 22a. In this example, the hardware accelerator logic module does not have a microprocessor. The first die 20 and second die 22 are connected via a full-duplex physical link generally designated 24 which functions as the die-to-die input/output interface. The full-duplex physical link 24 is configured and arranged with a suitable wire or conductor 24a for carrying data information content in accordance with the intended functions of the respective modules in a first direction between the first die 20 and the second die 24, and a second wire or conductor 24b for carrying data information content in accordance with the intended functions of the respective modules in a second direction opposite the first direction. The microprocessor 20b controls the modem logic module 20a of the first die 20 and the off-die hardware accelerator logic module 22a of the second die 22 via the full-duplex physical link 24.

According to some embodiments of the present invention the data information content is captured to relative small data packets. The small data packets are arranged and configured with sufficient suitable information to be self-contained. The small data packets in turn are transferred over the full-duplex physical link interface in fragments. Each small data packet identifies all the needed information for an on-chip-interconnect initiative or response and each link in accordance with the full-duplex physical link of the present invention as disclosed herein can carry both the initiatives and responses. The small data packet is configured and arranged with as many fields as necessary for identifying data, control and status content. These fields may carry the same information as the information that the on-chip-interconnect has however, some information may be unnecessary and in some embodiments a field that might contain the unnecessary information for a respective initiative or response may not be present and therefore in those embodiments the fields do not carry all of the same information as the information that the on-chip interconnect has. Further, the data packet structure can be selected to be independent of the on-chip-protocol. An on-chip protocol might be for example a standard protocol such as Asynchronous Response Mode (ARM), Advanced Microcontroller Bus Architecture (AMBA), Open Core Protocol-International Partnership (OCP-IP), Open Core Protocol (OCP) or it could be a vendor specific protocol. Moreover, an on-chip-interconnect protocol specific implementation can be indicated in an additional selection field in the data packet structure.

The self-contained data packet structure according to some embodiments of the present invention is arranged and configured for optimization to provide low latency response and fast packet source/target arbitration. The self-contained data packet structure may also be further optimized during the development of the system with which it is used to achieve a more optimal packet size by reducing or eliminating unnecessary fields. An example of such an unnecessary field is the response data field which is not used in a read initiative and is therefore unnecessary and need not be included in a data packet structure for a read initiative. The reduction or elimination of unnecessary fields in the data packet structure for optimization purposes provides for a variable size data packet structure. In other words, the length (number of data fields) of the data packet structure may be reduced or made smaller which in turn results in increased link efficiency, i.e. more data can pass through the link in a given time interval.

Moreover, the self-contained data packet format enables efficient link user arbitration, which in turn also contributes to low latency responses. Further, data packet independency also enables pipelining, i.e. many accesses can be pending at the same time in the system. For purposes of explanation and understanding the system here means the interconnected suitably configured circuits carried on a die surface via the full-duplex physical link whether it be the same die surface or on the surfaces of multiple dies connected via the full-duplex physical link. An additional feature provided by the self-contained data packet structure and the full-duplex physical link according to some embodiments of the present invention is out-of-order responses are realizable and supported for read operations and write operations and further the responses for the read operations and the write operations can be mixed and come out-of-order which allow access completion for additional efficiency.

In accordance with some embodiments of the present invention, a full-duplex connection is achieved by means of dedicated data signals for transmission and other dedicated data signals for reception. The direction of the dedicated data signals with the packet based data transfer enables peer-to-peer operation between the suitably arranged and configured circuits located on the die surface of a single die or the die surfaces of multiple dies. A full-duplex physical link implementation according to some embodiments of the present invention between the respective suitably arranged and configured circuits on the respective die surface or multiple die surfaces together with the used data packet format means that the data reception link and the data transmission link are fully decoupled. The full decoupling of the data reception link and the data transmission link makes it possible to utilize the full data throughput capacity offered by the full-duplex physical link.

According to some embodiments, the invention may be implemented in a link physical layer signal level implementation. The link physical layer signal level implementation can be for example, complementary metal-oxide-semi-conductor (CMOS), or other suitable differential input/output (I/O) types of implementation. In both examples of the CMOS and differential I/O implementation cases, the data signal count is one of the design parameters and thus can be selected. An actual implementation requires that there be some use-scenario analysis. In some other embodiments of the present invention, CMOS I/O technology is selected because there is a need to be able to use many different ASIC and FPGA technology implementations together. The scope of the present invention is not intended to be limited to any particular link physical layer signal implementation using technology now known or developed in the future.

Figure 5:
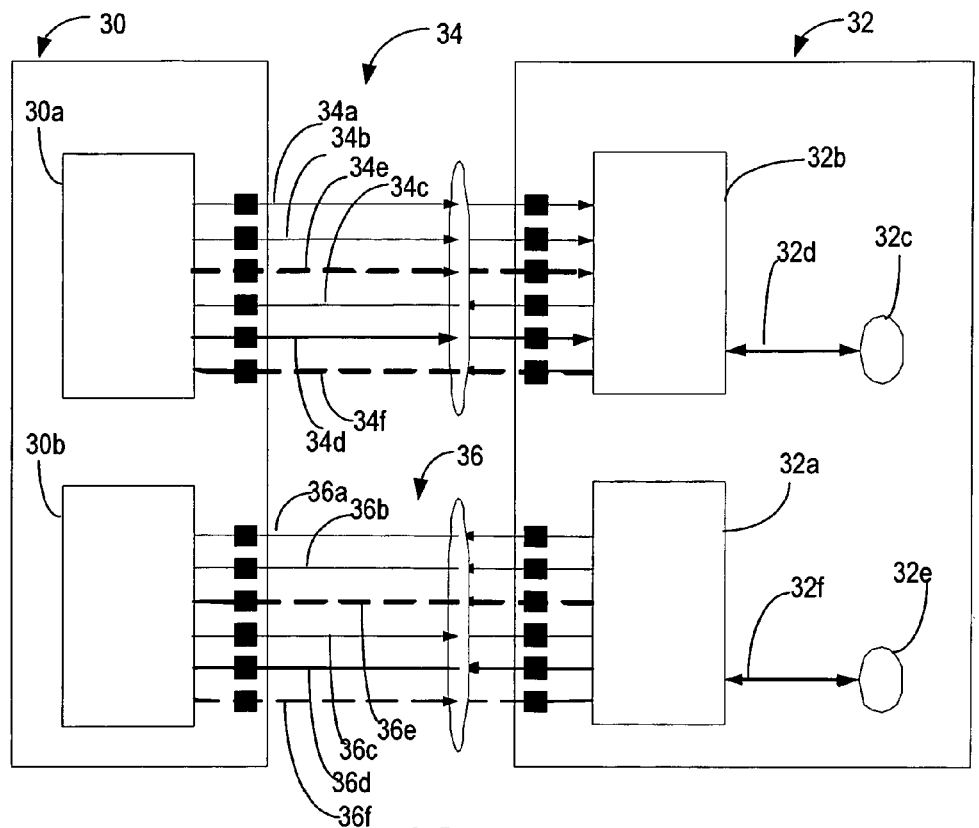
FIG. 5 shows an example of a basic implementation of a die-to-die fragmented data full-duplex physical link functionality according to some embodiments of the invention.

The full-duplex physical link functionality according to some embodiments of the present invention is implemented as a Fragmented Data Interconnect (FDI) link. FIG. 5 shows an example of a full-duplex physical link connection between circuits suitably arranged and configured for pipelining and peer-to-peer operation implemented with two FDI link connections. In FIG. 4 according to some embodiments of the invention as explained in further detail hereinbelow, each physical link 34, 36 carries on-chip-interconnect access initiatives and on-chip-interconnect responses that are formed to data packets, for example the self-contained data packets discussed and explained hereinabove. The scope of the present invention is not intended to be limited to any particular full-duplex physical link functionality implementation and may be implemented by any suitable technology now known or developed in the future.

In FIG. 5 according to some embodiments of the invention, a first die 30 is configured with a suitably arranged transmitter 30a and a suitably arranged receiver 30b. A second die 32 is configured with a suitably arranged transmitter 32a and a suitably arranged receiver 32b. A first fragmented data interconnect (FDI) physical link generally designated 34 is suitably arranged and configured for physically connecting the transmitter 30a of the first die 30 to the receiver 32b of the second die 32. The receiver 32b captures data packets such as for example the small data packets described herein that are transmitted by the transmitter 30a of the first die 30 and forms on-chip access initiatives or on-chip responses to and from suitably arranged and configured on-chip interconnect implemented circuitry 32c connected via the connection 32d with the receiver 32b. A second fragmented data interconnect (FDI) physical link generally designated 36 is suitably arranged and configured for physically connecting the transmitter 32a of the second die 32 and the receiver 30b of the first die 30. The transmitter 32a forms data packets such as for example the small data packets described herein from suitably arranged and configured on-chip interconnect implemented circuitry 32e connected via the connection 32f with the transmitter 32a. The data packets contain the initiatives and responses that are sent to the receiver 30b of the first die 30.

In FIG. 5 according to some embodiments of the present invention the fragmented data interconnect (FDI) physical link 34 is arranged and configured to connect the transmitter 30a of the first die 30 to the receiver 32b of the second die 32. The fragmented data link (FDI) physical link 34 is suitably arranged and configured with signal leads or conductors including a link clock lead 34a carrying clock signals, a present lead 34b for indicating that fragmented data is present or available, a ready lead 34c indicating to the transmitter 30a the receiver 32b readiness for new data fragments, a fragment lead 34d which carries the data fragment of the data packet from the transmitter 30a to the receiver 32b, an optional continue lead 34e to indicate fragmented packet continuity and an optional completed lead 34f for indicating the receiver packet execution completeness. The fragmented data interconnect (FDI) physical link 36 is suitably arranged and configured to connect the transmitter 32a of the second die 32 to the receiver 30b of the first die 30. The fragmented data link (FDI) physical link 36 is suitably arranged and configured with signal leads or conductors including a link clock lead 36a carrying clock signals, a present lead 36b for indicating that fragmented data is present or available, a ready lead 36c indicating to the transmitter 32a the receiver 30b readiness for new data fragments, a fragment lead 36d which carries the data fragment of the data packet, an optional continue lead 36e to indicate fragmented packet continuity and an optional completed lead 36f for indicating the receiver packet execution completeness. Accordingly, a full-duplex, fully decoupled physical link between the two dies 30 and 32 respectively is established and implemented by means of the fragmented data interconnect physical link 34 transferring data in one direction from the first die 30 to the second die 32, and the fragmented data interconnect physical link 36 transferring data in the opposite direction from the second die 32 to the first die 30.

The scope of the present invention is not intended to be limited to any particular implementation of the fragmented data interconnect (FDI) physical link to connect a transmitter and receiver located on respective different die surfaces and may be arranged and used to connect a transmitter and receiver located on the same die surface.

Figure 6:
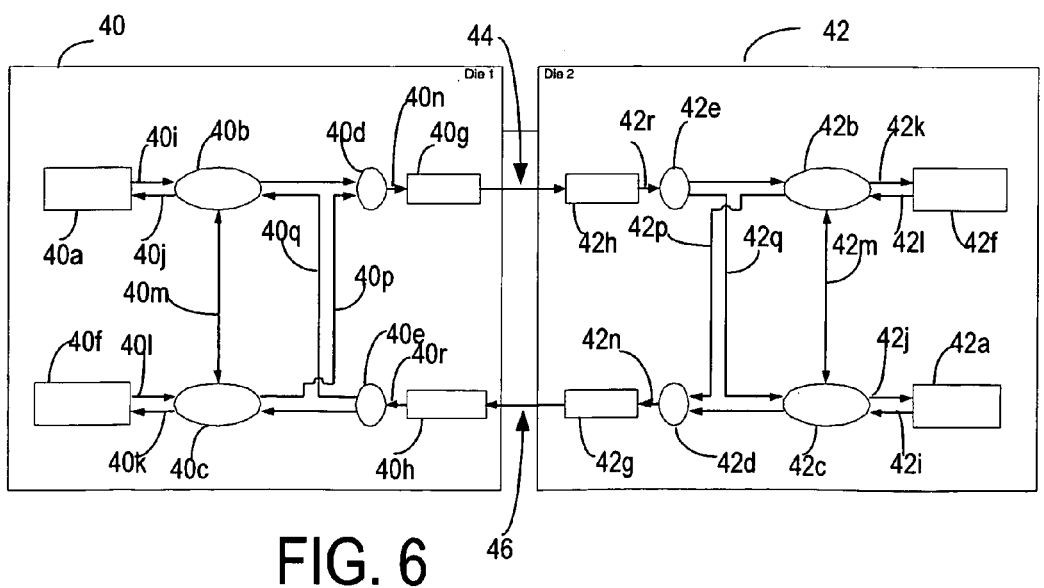
FIG. 6 shows an example of an implementation of a die-to-die fragmented data interconnect (FDI) physical link application according to some embodiments of the invention for peer-to-peer operation.

With reference to FIG. 6, a basic application of a fragmented data (FDI) physical link according to some embodiments of the present invention is presented therein showing first suitably arranged circuitry carried on a first die 40 and second suitably arranged circuitry carried on a second die 42 wherein the first circuitry and the second circuitry contain many hosts each of which are capable of initiating accesses. The hardware resources that are located off-die can be accessed through the fragmented data link. Thus, the first circuitry carried on die 40 can initiate accesses to the second circuitry carried on die 42 and the second circuitry 42 can initiate accesses to the first circuitry carried on die 40. Further, there can be many accesses pending at the same time. The fragmented data interconnect (FDI) physical link allows multiple microprocessor direct memory access (DMA) etc. designs that can initiate accesses to operate at the same. As a result link data throughput can be fully utilized. The latency even inside a die from a host (for example, a microprocessor) to an off-chip-interconnect node can be long. When the off-die link and the other die internal latencies are included, the system designs may begin to be very problematic. The full data throughput with full or complete off-chip link decoupling, and pipelining on off-chip links are valuable features that decrease latency (off-die internal latency and off-die link effect) when multiple hosts are executing an off-die access at the same time. Accordingly, the fragmented data interconnect (FDI) physical link according to some embodiments of the present invention meets the basic link requirements of low latency (fast processor accesses, minimal amount of wait cycles for the processor), yet provides a high enough bandwidth for data transfers and peer-to-peer connection. As used herein, peer-to-peer connection means that the respective circuitry of the connected dies need to be able to start accesses without help from each other to ease the system design restraints and restrictions.

According to some embodiments of the present invention as shown in FIG. 6, a first die 40 includes a microprocessor 40a, an on-chip interconnect implementation 40b, 40c, 40d and 40e, one or more modules 40f, a transmitter 40g and a receiver 40h. A second die 42 includes a microprocessor 42a, an on-chip interconnect implementation 42b, 42c, 42d and 42e, one or more modules 42f, a transmitter 42g and a receiver 42h. A fragmented data interconnect (FDI) physical link 44 connects the transmitter 40g of die 40 to the receiver 42h of die 42 for data transfer in a first direction between the die 40 and the die 42. A fragmented data interconnect (FDI) physical link 46 connects the transmitter 42g of die 42 to the receiver 40h of die 40 for data transfer in a second direction between the die 40 and the die 42 opposite the first direction.

The microprocessor 40a is arranged to send initiatives to the on-chip interconnect implementation 40b on the lead 40i and receive responses from the on-chip interconnect implementation 40b on the lead 40j. The modules 40f are arranged to receive initiatives from the on-chip interconnect implementation 40c on the lead 40k and to send responses to the on-chip interconnect implementation 40c on the lead 40l. Initiatives from and responses to the microprocessor 40a on die 40 are carried on a bi-directional bus 40m between on-chip interconnect implementations 40b and 40c. Initiatives from die 40 and responses to die 42 are input to the transmitter 40g from the on-chip interconnect implementation 40d on the lead 40n. The fragmented data packet in accordance with some embodiments of the invention is transferred via the fragmented data interconnect (FDI) physical link 44 to the receiver 42h on the die 42. Initiatives from die 42 and responses to die 40 are output on the lead 40r from the receiver 40h and inputted to the on-chip interconnect implementation 40e. Responses to the microprocessor 40a on die 40 are carried on the lead 40q connected between the on-chip interconnect implementation 40e and 40b. Responses to die 42 are carried on the lead 40p between the on-chip interconnect implementation 40c and 40d.

The microprocessor 42a is arranged to send initiatives to the on-chip interconnect implementation 42c on the lead 42i and receive responses from the on-chip interconnect implementation 42e on the lead 42j. The modules 42f are arranged to receive initiatives from the on-chip interconnect implementation 42b on the lead 42k and to send initiatives to the on-chip interconnect implementation 42b on the lead 42l. Initiatives from and responses to the microprocessor 42a on die 42 are carried on a bi-directional bus 42m between on-chip interconnect implementations 42b and 42c. Initiatives from die 42 and responses to die 40 are input to the transmitter 42g from the on-chip interconnect implementation 42d on the lead 42n. The fragmented data packet in accordance with some embodiments of the invention is transferred via the fragmented data interconnect (FDI) physical link 46 to the receiver 40h on the die 40. Initiatives from die 40 and responses to die 42 are output on the lead 42r from the receiver 42h and inputted to the on-chip interconnect implementation 42e. Responses to the microprocessor 42a on die 42 are carried on the lead 42q connected between the on-chip interconnect implementation 42e and 42c. Responses to die 40 are carried on the lead 42p between the on-chip interconnect implementation 42b and 42d.

It will be recognized and appreciated that as shown in FIG. 6, peer-to-peer connection enables a die based autonomous operation with die specific resource sharing through the fragmented data interconnect (FDI) physical link. The respective circuitry carried on each die 40, 42 can start an access over the fragmented data interconnect (FDI) physical link 44, 46 respectively without assistance from the respective circuitry carried on the other respective die.

Moreover, it will be recognized and appreciated that as also shown according to some embodiments of the present invention in FIG. 6, the circuitry carried on the respective dies 40, 42 is arranged and configured for pipelining operation which allows multiple accesses to be pending at the same time. The pipelining operation enables full link data throughput because the fragmented data interconnect (FDI) physical link does not need to wait until an access has been completed before the next access can be initiated. From a perfect link design standpoint, the fragmented data interconnect (FDI) physical link is not optimized for a single access completion time, however the advantages of off-die logic control outweigh any advantages of a single access completion time design. It should also be recognized that pipelining prevents an on-chip-master situation, for example, multiple microprocessors, from attempting to halt each other, if they are simultaneously accessing a hardware resource beyond the die boundary. The scope of the invention is not intended to be limited to any particular implementation and may be implemented on a single die surface or on multiple die surfaces in accordance with a given system design implemented with technology now known or developed in the future.

Figure 7:
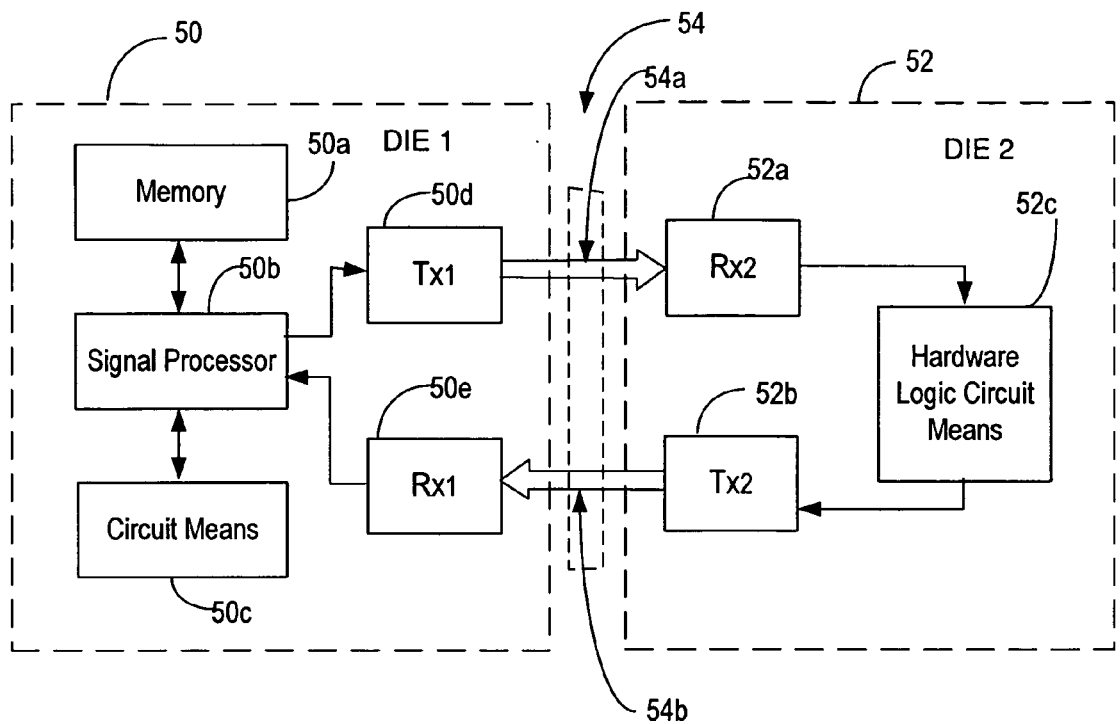
FIG. 7 is a functional block diagram showing an example of a system implemented on separate dies according to some embodiments of the invention.
Figure 8:
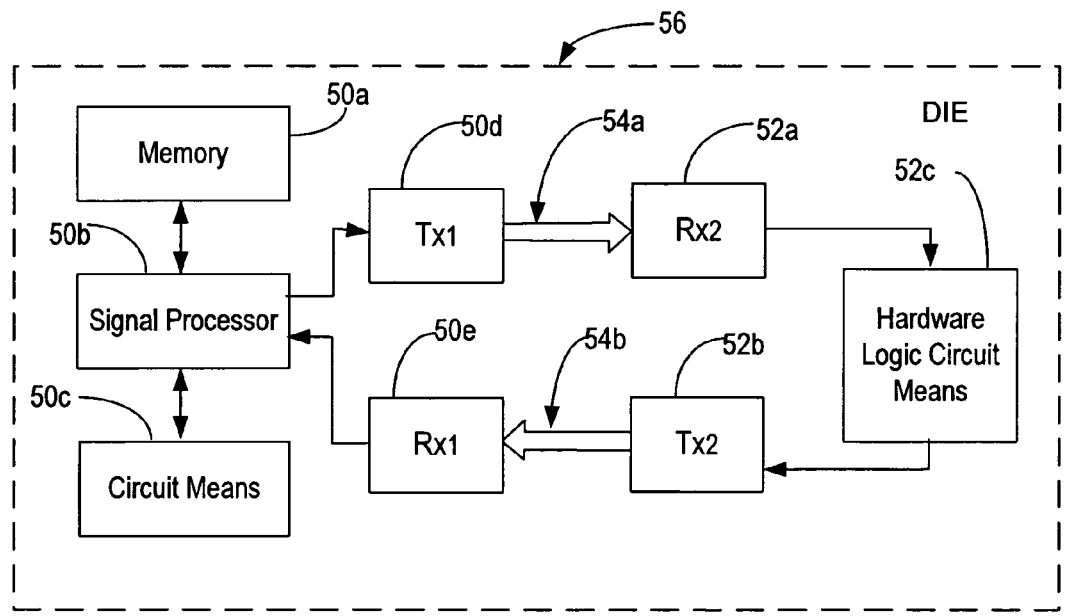
FIG. 8 is a functional block diagram showing the system of FIG. 7 implemented on the same die.

In accordance with some embodiments of the present invention a system may be implemented on separate dies for example as shown in the functional block diagram illustrated in FIG. 7. A first die 50 includes a first suitably arranged and configured circuit including a memory 50a, a suitable signal processor 50b such as a digital signal processor or microprocessor for controlling the operation to carry out the intended functionality, and circuit means 50c for performing the intended functionality, a transmitter 50d and receiver 50e. A second die 52 includes a second suitably arranged and configured circuit including a hardware logic circuit means 52c, a receiver 52a and a transmitter 52b. A fragmented data interconnect (FDI) physical link 54 is suitably arranged and configured according to some embodiments of the present invention so that the transmitter 50d is physically connected to the receiver 52a via the conductors or wires 54a and the transmitter 52b is physically connected to the receiver 50e via different conductors or wires 54b. The wires 54a and 54b do not carry or share the same data signals and therefore full decoupling is realized. Further, the hardware logic circuit means 52c may be implemented in any suitable manner such as for example as a field programmable gate array (FPGA). In this configuration according to some embodiments, the hardware logic may be changed during the design of the system as necessary independently of any changes to the microprocessor or software used by the microprocessor. Thus there can be multiple changes to the hardware logic and accordingly the die 52 for example to accommodate special or specific applications, which may be low number volume applications. Since the die 50 may contain a rather static design under software control, an application specific integrated circuit (ASIC) package may be used for implementation. Once the system design is mature and/or there are sufficiently large volumes the unique architecture according to the invention allows the circuitry carried on the two separate dies 50, 52 to be combined onto a single die for example the die 56 as shown in FIG. 8 wherein like reference numbers refer to like parts in FIG. 7.

In some embodiments the data transmitter and data receiver may be located on a different and separate die surface from the die surface carrying the suitably arranged circuit. Accordingly, the scope of the invention is not intended to be limited to any particular implementation using technology now known or developed in the future.

Figure 9:
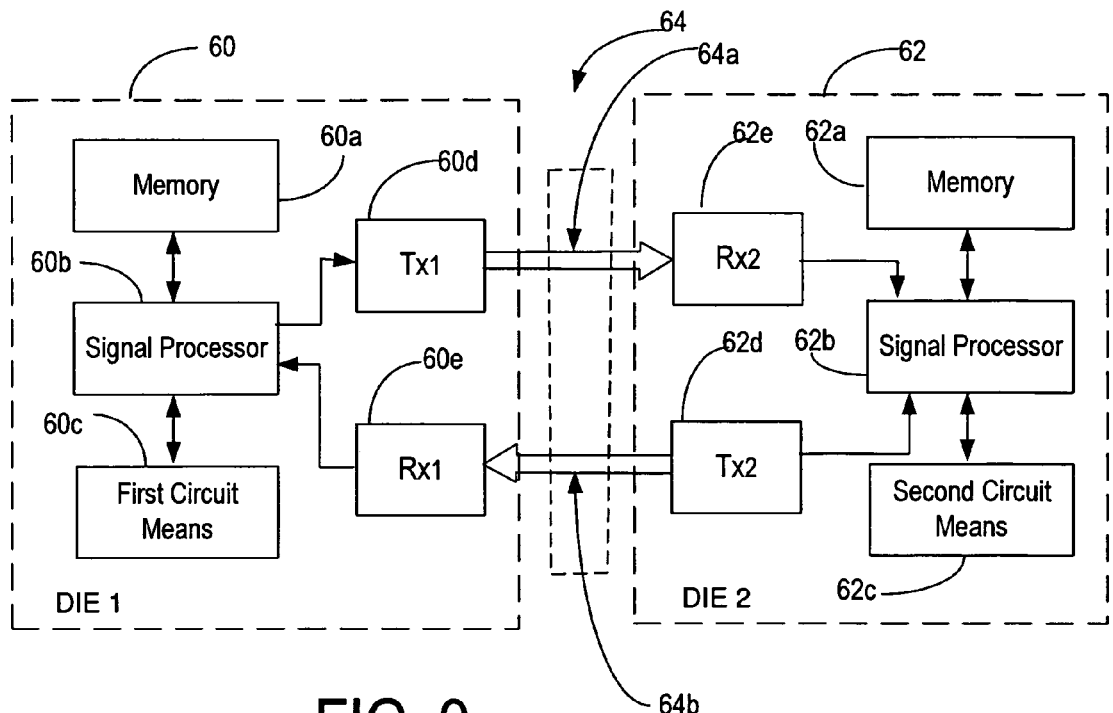
FIG. 9 is a functional block diagram showing an example of a system implemented on separate dies according to some embodiments of the invention.
Figure 10:
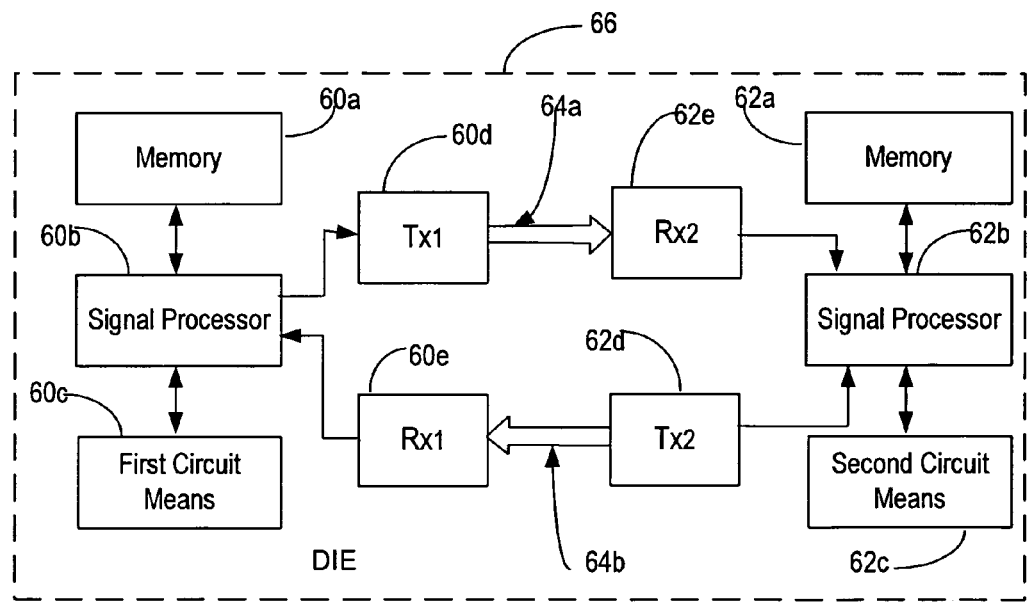
FIG. 10 is a functional block diagram showing the system of FIG. 9 implemented on the same die.

In accordance with some embodiments of the present invention a system may be implemented on separate dies for example as shown in the functional block diagram illustrated in FIG. 9. A first die 60 includes a first suitably arranged and configured circuit including a memory 60a, a suitable signal processor 60b such as a digital signal processor or microprocessor for controlling the operation to carry out the intended functionality, and a first circuit means 60c for performing the intended functionality, a transmitter 60d and receiver 60e. A second die 62 includes a second suitably arranged and configured circuit including a memory 62a, a suitable signal processor 62b such as a digital signal processor or microprocessor for controlling the operation to carry out the intended functionality, and second circuit means 62c for performing the intended functionality, a transmitter 62d and receiver 62e. A fragmented data interconnect (FDI) physical link 64 is suitably arranged and configured according to some embodiments of the present invention so that the transmitter 60d is physically connected to the receiver 62e via the conductors or wires 64a and the transmitter 62d is physically connected to the receiver 60e via different conductors or wires 64b. The wires 64a and 64b do not share or carry the same data signals and therefore full decoupling is realized. This configuration according to some embodiments will be recognized as providing peer-to-peer and pipelining operation. In a similar manner as discussed above, changes may be made to dies 60 and 62 independently from one another. Also in a similar manner as discussed above, the unique architecture according to some embodiments of the present invention allows the respective circuitry carried on the two separate dies 60, 62 to be combined onto the surface of a single die for example the die 66 as shown in FIG. 10 wherein like reference numbers refer to like parts in FIG. 9.

It is to be understood that the above-described arrangements are only illustrative of the application of the principles of the present invention and are not to be construed as limitations of the invention. Numerous modifications and alternative arrangements may be devised by those skilled in the art without departing from the scope of the invention and the appended claims are intended to cover such modifications and arrangements. Further, the invention contemplates all embodiments that may be inferred directly or indirectly from the disclosure and drawings whether or not expressly stated and claimed.

That invention claimed:

1. A method, comprising:
   operatively connecting a first suitably arranged circuit and a second suitably arranged circuit located on a die surface via a physical link;
   configuring said physical link for full-duplex operation,
   configuring said first suitably arranged circuit and said second suitably arranged circuit to provide peer-to-peer connection and operation;
   accessing resources located on one of said first and second suitably arranged circuits by the other of said first and second suitably arranged circuits and accessing resources located on the other of said first and second suitably arranged circuits by the one of said first and second suitably arranged circuits; and
   transferring data information content between said operatively connected first suitably arranged circuit and said second suitably arranged circuit via said full-duplex physical link,
   wherein said full-duplex physical link is arranged and configured as a fragmented data interconnect physical link wherein said data information content comprises fragmented data packets arranged and configured for transfer in a one direction link from a first of said first or second suitably arranged and configured circuits for receiving in the other of said first or second suitably arranged and configured circuits, and wherein said data information content comprises fragmented data packets arranged and configured for transfer in a second one direction link in a direction opposite from said first one direction link from the second of said first or second suitably arranged and configured circuits for receiving in the other of said first or second suitably arranged and configured circuits.

2. The method according to claim 1 further comprising locating said first suitably arranged circuit and said second suitably arranged circuit on the surface of the same die.

3. The method according to claim 1 further comprising locating said first suitably arranged circuit on the surface of a first die and locating said second suitably arranged circuit on the surface of a second die.

4. The method according to claim 1 wherein the data information content is configured as fragmented data for transfer between the operatively connected first and second suitably arranged circuits in a self-contained data packet structure.

5. The method according to claim 4 further configuring said self-contained data packet structure for identifying suitable information for on-chip interconnect implementation initiatives and on-chip interconnect implementation responses.

6. The method according to claim 3 further comprising providing via said full-duplex physical link off-die interconnect accesses between a respective one or more first suitably arranged circuits located on said first die and a respective one or more second suitably arranged circuits located on said second die.

7. The method according to claim 6 further comprising transferring data information content in one direction only from said first die to said second die and in the opposite direction only from said second die to said first die.

8. A device, comprising:
   a first suitably arranged and configured circuit located on a die surface;
   a second suitably arranged and configured circuit located on a die surface;

said first suitably arranged and configured circuit and said second suitably arranged and configured circuit further are configured to provide peer-to-peer connection and operation; and a full-duplex physical link arranged and configured for operatively connecting said first suitably arranged and configured circuit located on said die surface to said second suitably arranged and configured circuit located on said die surface for transferring data information content between said first suitably arranged and configured circuit and said second suitably arranged and configured circuit, and one of said first or second suitably arranged and configured circuits accesses resources located on the other of said first or second suitably arranged and configured circuits, wherein said full-duplex physical link is arranged and configured as a fragmented data interconnect physical link wherein said data information content comprises fragmented data packets arranged and configured for transfer in a one direction link from a first of said first or second suitably arranged and configured circuits for receiving in the other of said first or second suitably arranged and configured circuits, and wherein said data information content comprises fragmented data packets arranged and configured for transfer in a second one direction link in a direction opposite from said first one direction link from the second of said first or second suitably arranged and configured circuits for receiving in the other of said first or second suitably arranged and configured circuits.

9. The device according to claim 8 wherein said first suitably arranged and configured circuit is located on a first die surface and said second suitably arranged and configured circuit is located on a second die surface.

10. The device according to claim 9 wherein said first die surface and said second die surface comprise a surface of a single die.

11. The device according to claim 9 wherein at least one of said first suitably arranged and configured circuit or said second suitably arranged and configured circuit comprises a microprocessor.

12. The device according to claim 11 further comprising:
said first suitably arranged and configured circuit comprising an on-chip interconnect implementation, and
said second suitably arranged and configured circuit comprising an on-chip interconnect implementation.

13. The device according to claim 12 further comprising:
said first suitably arranged and configured circuit further comprising a first data transmitter and a first data receiver, and
said second suitably arranged and configured circuit further comprising a second data transmitter and a second data receiver.

14. The device according to claim 13 wherein said first data transmitter and said second data transmitter are arranged and configured for forming self-contained data packets.

15. The device according to claim 14 wherein said self-contained data packets are further arranged and configured as fragmented data packets.

16. The device according to claim 15 comprising said first data receiver and said second data receiver are further arranged and configured for receiving said fragmented data packets.

17. A device, comprising:
a first die comprising microprocessor controlled cellular modem logic;
a second die comprising an evolved universal terrestrial radio access network hardware accelerator;
a physical link arranged and configured for full duplex operation as a die input/output interface for connecting said first die to said second die such that said microprocessor is enabled with off-die access to and from said second die, said microprocessor controlled cellular modem logic on said first die accessing resources of said evolved universal terrestrial radio access network hardware accelerator located on said second die, and said evolved universal terrestrial radio access network hardware accelerator located on said second die accessing resources of said microprocessor controlled cellular modem logic located on said first die, said microprocessor controlled cellular modem logic and said evolved universal terrestrial radio access network hardware accelerator further configured to provide peer-to-peer connection and operation, wherein said full-duplex physical link is arranged and configured as a fragmented data interconnect physical link wherein data information content transferred between said first die and said second die comprises fragmented data packets arranged and configured for transfer in a one direction link from a first of said first or second dies for receiving in the other of said first or second dies, and wherein said data information content comprises fragmented data packets arranged and configured for transfer in a second one direction link in a direction opposite from said first one direction link from the second of said first or second dies for receiving in the other of said first or second dies.

18. A device, comprising:
one or more modules arranged and configured to operatively connect first and second suitably arranged circuits located on a die surface via a physical link, said first and second suitably arranged circuit further configured to provide peer-to-peer connection and operation wherein one of said first and second suitably arranged and configured circuits is configured to access resources located on the other of said first and second suitably arranged circuits and the other of said first and second suitably arranged and configured circuit is configured to access resources located on the one of said first and second suitably arranged and configured circuits;
one or more modules arranged and configured to configure the physical link for full-duplex operation, and
one or more modules arranged and configured to transfer data information content between the first and second suitably arranged circuits via the full-duplex physical link, wherein said full-duplex physical link is arranged and configured as a fragmented data interconnect physical link wherein said data information content comprises fragmented data packets arranged and configured for transfer in a one direction link from a first of said first or second suitably arranged and configured circuits for receiving in the other of said first or second suitably arranged and configured circuits, and wherein said data information content comprises fragmented data packets arranged and configured for transfer in a second one direction link in a direction opposite from said first one direction link from the second of said first or second suitably arranged and configured circuits for receiving in the other of said first or second suitably arranged and configured circuits.

19. The device according to claim 18 further comprising a mobile communication device.

* * * * *